(12) United States Patent
Szalko et al.

(10) Patent No.: US 10,046,944 B2
(45) Date of Patent: Aug. 14, 2018

(54) UNDERGROUND MINING MACHINE

(71) Applicant: Caterpillar Global Mining Equipment LLC., South Milwaukee, WI (US)

(72) Inventors: James R. Szalko, Lacon, IL (US); Rex A. Glover, Deer Creek, IL (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 338 days.

(21) Appl. No.: 14/988,927

(22) Filed: Jan. 6, 2016

(65) Prior Publication Data
US 2017/0190540 A1    Jul. 6, 2017

(51) Int. Cl.
B65H 75/42    (2006.01)
B65H 75/44    (2006.01)
H02G 11/02    (2006.01)
E21F 17/06    (2006.01)

(52) U.S. Cl.
CPC ....... B65H 75/425 (2013.01); B65H 75/4484 (2013.01); E21F 17/06 (2013.01); H02G 11/02 (2013.01); B65H 2701/34 (2013.01)

(58) Field of Classification Search
CPC .. H02G 11/02; B65H 75/425; B65H 2701/34; B60L 9/00; B60L 2200/40
See application file for complete search history.

(56) References Cited

U.S. PATENT DOCUMENTS

| | | | |
|---|---|---|---|
| 1,393,286 A | 10/1921 | Hosford | |
| 1,413,250 A * | 4/1922 | Wolfe | B60L 3/00 |
| | | | 191/12 R |
| 2,359,123 A * | 9/1944 | Krapf | B60M 7/00 |
| | | | 191/12 R |
| 3,380,545 A | 4/1968 | Kemper | |
| 3,863,741 A * | 2/1975 | Mitsuishi | H02G 11/02 |
| | | | 191/12.2 A |
| 4,511,100 A * | 4/1985 | Oetringhaus | B60L 9/16 |
| | | | 191/12.2 A |
| 4,700,023 A * | 10/1987 | Hillmann | B60M 7/00 |
| | | | 191/12 R |
| 6,119,837 A | 9/2000 | Tschurbanoff et al. | |
| 8,042,663 B1 * | 10/2011 | Pack | B65H 75/425 |
| | | | 191/12.2 A |
| 8,657,041 B2 * | 2/2014 | Ishii | A01D 34/64 |
| | | | 180/197 |
| 8,989,929 B2 * | 3/2015 | Thomas | B60L 9/00 |
| | | | 700/255 |

(Continued)

FOREIGN PATENT DOCUMENTS

CN    203992173    12/2014
GB    1411004       10/1975

*Primary Examiner* — Zachary L Kuhfuss
(74) *Attorney, Agent, or Firm* — Miller, Matthias & Hull (57) ABSTRACT

A system for managing an underground mining machine is disclosed. The system may include a reel-in switch located in an operator station configured to generate plurality of reel-in signals, and a reel-out switch located in the operator station configured to generate a reel-out signal. The system may additionally include an electronic controller in electrical communication with the reel-in switch and the reel-out switch. The electronic controller may be configured to receive the plurality of reel-in signals from the reel-in switch and enter into two or more reeling-in modes in response to the plurality of reel-in signals.

16 Claims, 4 Drawing Sheets

(56) References Cited

U.S. PATENT DOCUMENTS

| | | | |
|---|---|---|---|
| 9,248,757 B2 * | 2/2016 | Kuittinen | B60L 11/1803 |
| 9,507,360 B2 * | 11/2016 | Tojima | B60M 7/00 |
| 2006/0071116 A1 * | 4/2006 | Quenneville | B65H 75/425 |
| | | | 242/557 |
| 2011/0184597 A1 * | 7/2011 | Thomas | B60L 9/00 |
| | | | 701/22 |
| 2014/0069758 A1 * | 3/2014 | Tojima | E02F 9/2016 |
| | | | 191/12.2 R |
| 2014/0166419 A1 * | 6/2014 | Krellner | B65H 75/425 |
| | | | 191/12.2 R |
| 2014/0262664 A1 * | 9/2014 | Osara | B60L 9/24 |
| | | | 191/12.2 R |
| 2015/0028146 A1 * | 1/2015 | Tsukui | H02G 11/02 |
| | | | 242/390.9 |
| 2016/0176676 A1 * | 6/2016 | Tsukui | B65H 75/42 |
| | | | 242/390.9 |

\* cited by examiner

UNDERGROUND MINING MACHINE

TECHNICAL FIELD

This disclosure generally relates to an underground mining machine and, more particularly, to systems and methods to manage an underground mining machine.

BACKGROUND

Underground mining machines are commonly used around the world to extract minerals, metals and other materials from various hard and soft rock environments. One example of an underground mining machine is a jumbo drill, although many other types exist. The underground mining machine may include a reeling system that may include a power cable coupling a power source for the machine to a working implement of the machine. A cable reel may also be rotatably associated with the underground mining machine and be configured to coil and uncoil the power cable. Further, the reeling system may include a cable reel-motor rotationally engaged with the cable reel. The cable reel-motor may be configured to rotate the cable reel in a first direction when coiling the power cable and rotate the cable reel in a second direction when uncoiling the power cable.

While moving the underground mining machine in a reverse direction, a velocity at which the operator is moving the underground mining machine may be greater than a velocity at which the cable reel-motor is rotating the cable reel. In this instance, the operator may accidentally overrun the power cable, leading to damage and the need to repair or replace the power cable. Additionally, while moving the underground mining machine in a forward direction, and when an amount of the power cable still coiled around the cable reel is nearing its end, the velocity at which the operator is moving the underground mining machine may leave little time for the operator to stop the underground mining machine before breaking the connection between the power cable and the underground mining machine.

Although underground mining machine power cable winding and unwinding schemes are known, there is still room for improvement. For example, U.S. Pat. No. 6,119,837 to Tschurbanoff et al. discloses a hydraulic control system to regulate the rate at which the cable reel winds or unwinds the power cable as a function of machine speed. More specifically, as machine speed increases the mass flowrate of hydraulic fluid sent to a hydraulic motor rotatably engaged with the cable reel increases, and vice versa.

While arguably effective for its specific purposes, such prior art system only attempts to match cable reel speed with underground mining machine speed, failing to recognize a need to operate the underground mining machine in any different manner. Such system also relies on a fluid-based control system, and thus there may be lag between the underground mining machine speed and the cable reel speed, leading to sagging and stretching of the power cable. Also, as a result of such lag, the momentum of the machine may still be great enough that the machine continues to move even after receiving a machine stop signal. In this instance, the power cable may break away from the underground mining machine.

SUMMARY

In accordance with one aspect of the present disclosure, a system for managing an underground mining machine is disclosed. The system may include a reel-in switch located in an operator station configured to generate a plurality of reel-in signals and a reel-out switch located in the operator station configured to generate a reel-out signal. The system may additionally include an electronic controller in electrical communication with the reel-in switch and the reel-out switch. The electronic controller may be configured to receive the plurality of reel-in signals from the reel-in switch and enter into two or more reeling-in modes in response to the plurality of reel-in signals.

In accordance with another aspect of the present disclosure, an underground mining machine is disclosed. The underground mining machine may include a chassis and a motor supported by the chassis. Further, the underground mining machine may include a cable reel rotatably associated with the underground mining machine and the cable reel may be configured to coil and uncoil a power cable. A cable reel-motor may be rotationally engaged with the cable reel, and the cable reel-motor may be configured to rotate the cable reel in a first direction when coiling the power cable, and may further be configured rotate the cable reel in a second direction when uncoiling the power cable. The underground mining machine may additionally include a cable-reel-near-empty-sensor operatively associated with the cable reel and the cable-reel-near-empty-sensor may be configured to generate a reel-near-empty signal when activated. Further, the underground mining machine may include a speed sensor that may be operatively associated with the underground mining machine that may be configured to generate a speed signal. Moreover, the underground mining machine may include an operator station including a reel-in switch configured to generate a plurality of reel-in signals and a reel-out switch configured to generate a reel-in signal. In addition, the underground mining machine may include an electronic controller. The electronic controller may be in electrical communication with the cable reel-motor, the cable-reel-near-empty-sensor, the speed sensor, the reel-in switch and the reel-out switch. The electronic controller may be configured to receive the reel-near-empty signal, the speed signal, the plurality of reel-in signals and the reel-out signal and generate a ccable-reel-out-signal and a cable-reel-in signal in response to at least one of the reel-near-empty signal, the speed signal, the plurality of reel-in signals and the reel-out signal.

In accordance with another embodiment of the present disclosure, a method for managing an underground mining machine is disclosed. The method may include receiving, at an electronic controller located in an underground mining machine, a plurality of reel-in signals from a reel-in switch located in an operator station, and entering, using the electronic controller, a latching reeling-in mode in response to receiving a first reel-in signal from the reel-in switch. The latching reeling-in mode may be configured to limit a reverse direction speed of the underground mining machine to a reverse-direction maximum velocity. Further, the latching reeling-in mode may be configured to receive a speed signal from a speed sensor operatively associated with the underground mining machine and calculate a reverse direction velocity for the underground mining machine. Moreover, the latching reeling-in mode may be configured to generate a cable-reel-in signal while the reverse direction velocity of the underground mining machine is greater than zero and less than or equal to the reverse-direction maximum velocity.

These and other aspects and features of the present disclosure will be more readily understood when read in conjunction with the accompanying drawings.

BRIEF DESCRIPTION

DETAILED DESCRIPTION OF THE DISCLOSURE

Figure 1:
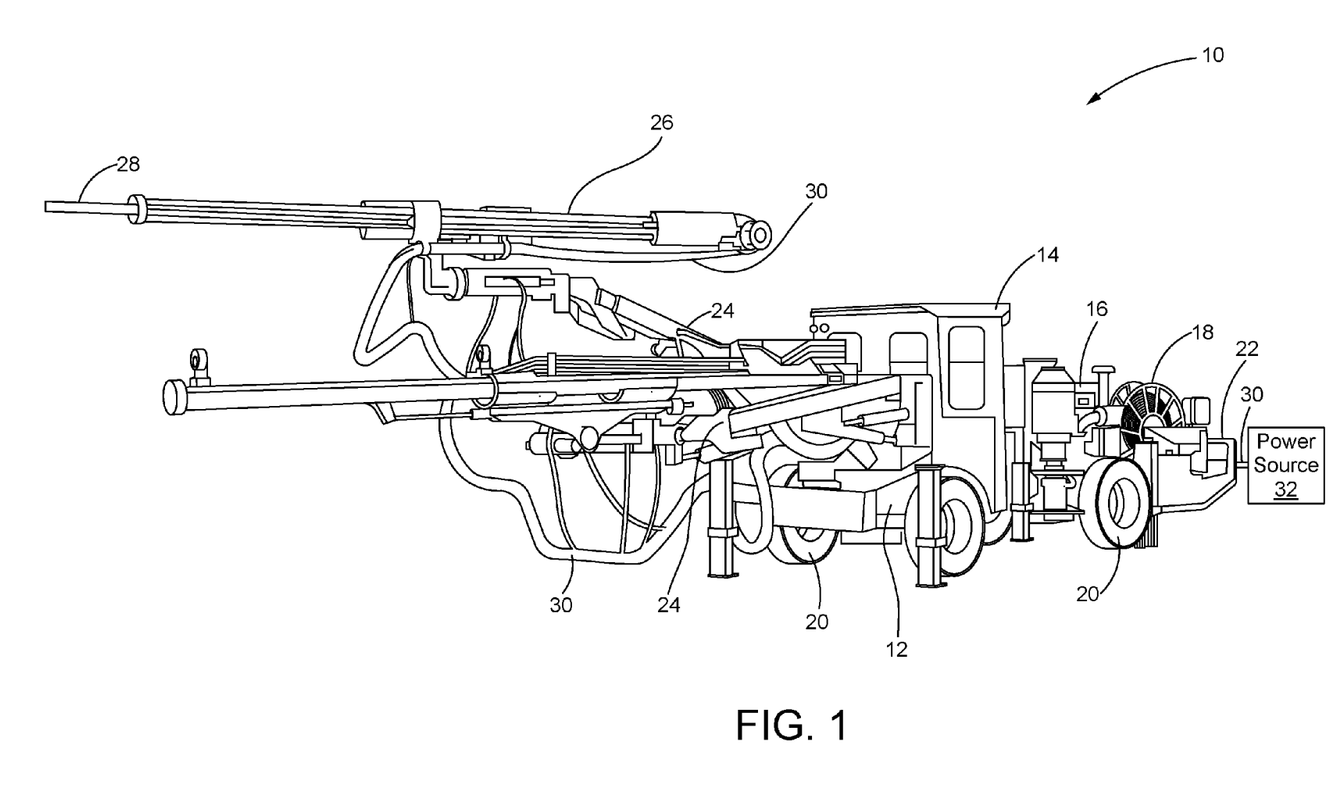
FIG. 1 is a perspective view of an underground mining machine constructed in accordance with the present disclosure.

Various aspects of the disclosure will now be described with reference to the drawings, wherein like reference numbers refer to like elements, unless specified otherwise. Referring to FIG. 1, a perspective view of an underground mining machine 10 is illustrated, according to an aspect of the disclosure. As seen there, the underground mining machine 10 may include a chassis 12 supporting an operator station 14, a motor 16 or other power supplying engine and a cable reel 18. The chassis 12 may be supported by wheels 20 or other ground engaging members such as endless tracks and the like. Further, the underground mining machine 10 may include a motor control cabinet 22 wherein some functions of the underground mining machine 10 may be controlled separately from the operator station 14 as described in fuller detail below. While the underground mining machine 10 depicted in FIG. 1 is a jumbo drill, the teachings of the present disclosure are not limited to jumbo drills. Rather, the teachings of the present disclosure may find use in many other mining machines such as, but not limited to, an underground mining loader, a continuous mining machine, a longwall mining machine, a flexible conveyor train and the like.

Further, one or more arms 24 may be operatively connected to the underground mining machine 10. Each of the one or more arms 24 may be operated independently of each other, be articulated and move in three-dimensions. Moreover, a rail 26 may be operatively engaged with each of the one or more arms 24. Each rail 26 may be slidably engaged with a work implement 28 such as, but not limited to, a rock drill, a clawed manipulator and the like. The work implement 28, being slidably engaged with the rail 26, may move between a working position wherein the work implement 28 is engaging a wall of an underground mine and a retracted position wherein the work implement 28 is not engaging the wall of the underground mine.

Additionally, the underground mining machine 10 may include a power cable 30 extending between the work implement 28 and a power source 32 that may couple the work implement 28 with the power source 32. The power cable 30 may be configured to supply primary or secondary power, such as, but not limited to, electrical, hydraulic or pneumatic power, to the work implement 28. The portion of the power cable 30 associated with the one or more arms 24 may be of sufficient length to accommodate a full range of motion of the work implement 28 between the working position and the retracted position. Additionally and alternatively, the portion of the power cable 30 associated with the one or more arms 24 may be folded or calendared when the work implement 28 is moved to the retracted position or when the one or more arms 24 are moved to a retracted state.

Figure 2:
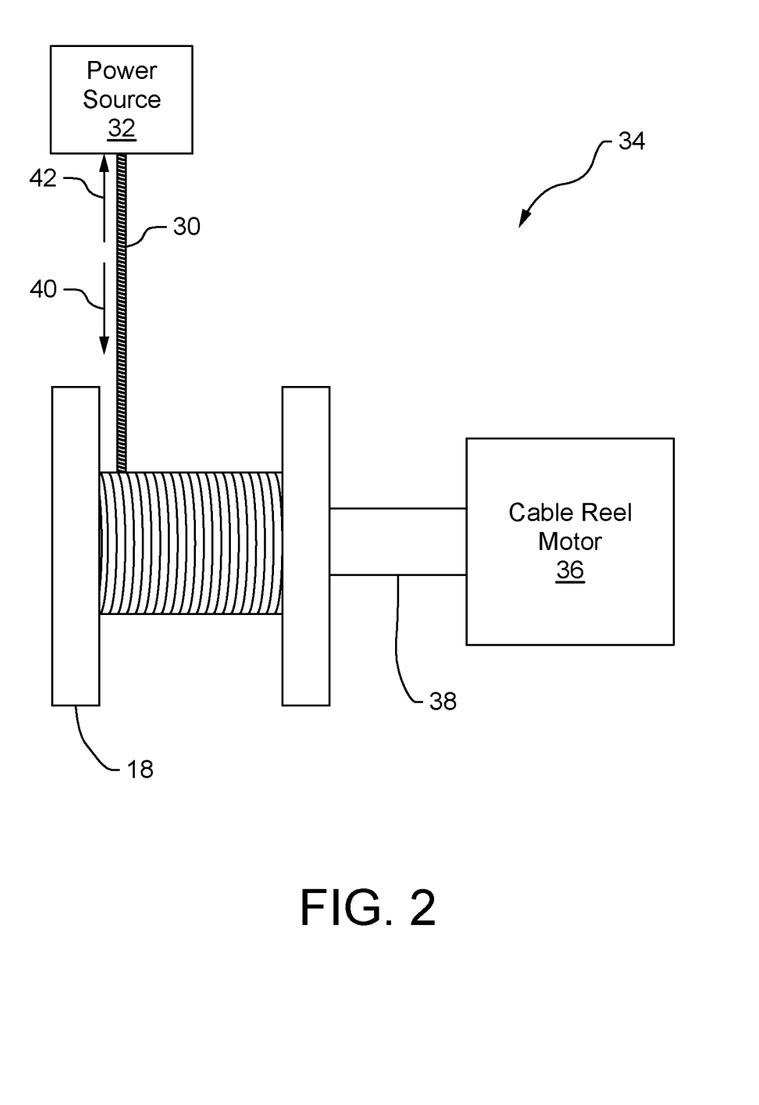
FIG. 2 is a schematic diagram of a power system that may be used with the underground mining machine of FIG. 1.

Turning to FIG. 2, a depiction of a reeling system 34 that may be utilized with the underground mining machine 10 of FIG. 1 is schematically illustrated. The reeling system 34 may include the cable reel 18 previously described. More specifically, however, the cable reel 18 may be rotatably associated with the underground mining machine 10 and the cable reel 18 may be configured to coil and uncoil the portion of the power cable 30 between the underground mining machine 10 and the power source 32. Further, the reeling system 34 may include a cable reel-motor 36. The cable reel-motor 36 may be rotationally engaged with the cable reel 18. For example, the cable reel-motor 36 may be rotationally engaged with the cable reel 18 by a shaft 38. When the cable reel-motor 36 is activated, it may rotate the cable reel 18 in a first direction 40 when coiling the power cable 30 about the cable reel 18 and rotate the cable reel 18 in a second direction 42 when uncoiling the power cable 30 from the cable reel 18.

Figure 3:
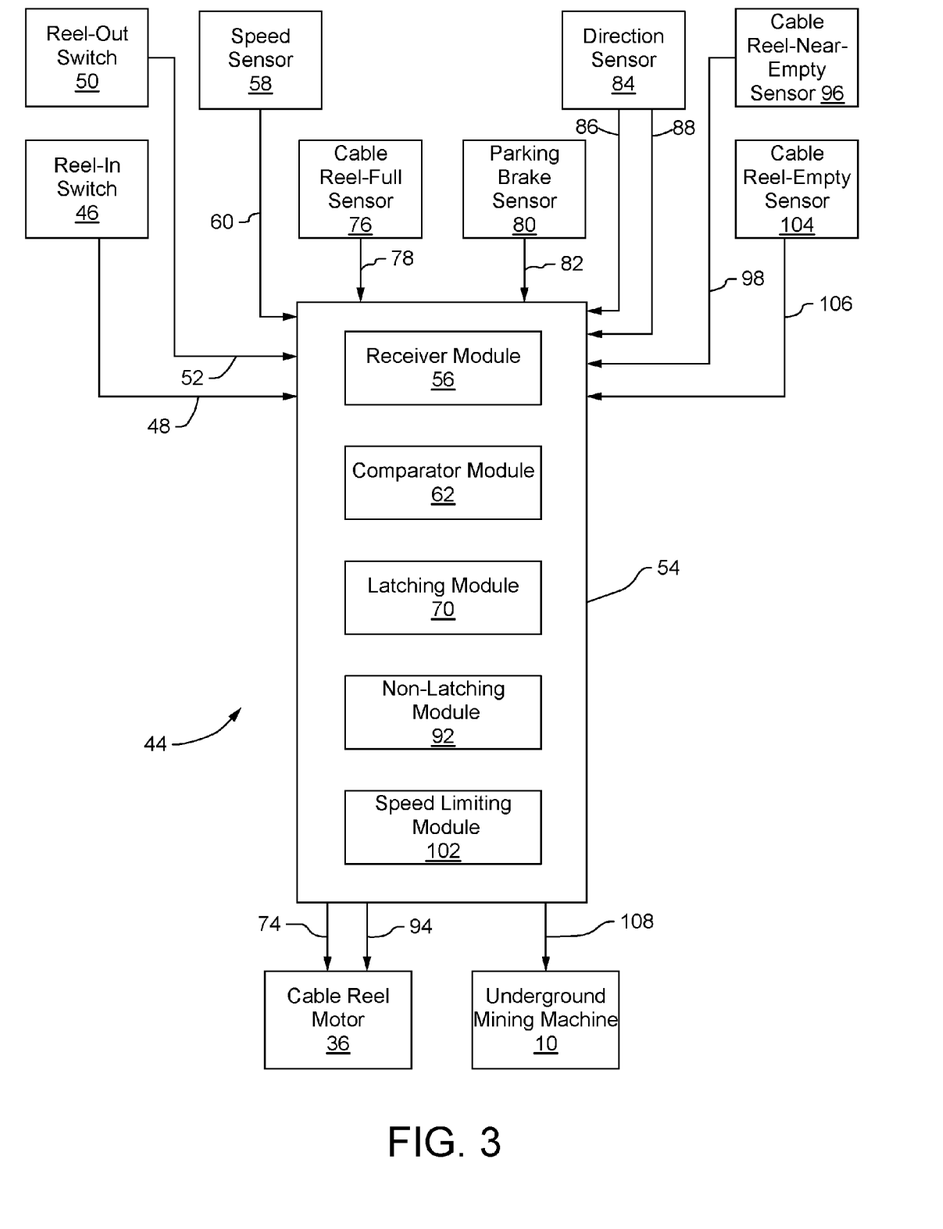
FIG. 3 is a block diagram of an exemplary control system that may be used in conjunction with the underground mining machine of FIGS. 1 and 2.

Turning now to FIG. 3, a diagram of a control system 44 for managing the underground mining machine 10 is depicted. As illustrated there, the control system 44 may include a reel-in switch 46 configured to generate a plurality of reel-in signals 48 when actuated. In one embodiment the reel-in switch 46 is located in the operator station 14 described above. However, this is only exemplary as it is contemplated that the reel-in switch 46 may be located at other locations of the underground mining machine 10, such as, but not limited to, the motor control cabinet 22 previously discussed. Further, the control system 44 may include a reel-out switch 50 configured to generate a reel-out signal 52 when actuated. In one embodiment the reel-out switch 50 is located in the operator station 14 previously discussed Like the reel-in switch 46, however, this location is only exemplary as the reel-out switch 50 may be located at other locations of the underground mining machine 10 including the motor control cabinet 22.

Further, as depicted, the control system 44 may include an electronic controller 54 that is in electrical communication with the reel-in switch 46 and the reel-out switch 50. Further, as is shown, being in electrical communication with the reel-in switch 46 and the reel-out switch 50, the electronic controller 54 may be configured to receive the plurality of reel-in signals 48 and the reel-out signal 52. For example, as represented, the electronic controller 54 may include a receiver module 56 configured to receive the plurality of reel-in signals 48 and the reel-out signal 52. Moreover, while the electronic controller 54 is represented as being a stand-alone device, it may be integrated into the electronic control module (ECM) or electronic control unit (ECU) of the underground mining machine 10. Furthermore, the electronic controller 54 may be implemented using any one or more of a processor, a microprocessor, a microcontroller, a field programmable gate array (FPGA), a programmable read-only member (PROM), application specific integrated circuit (ASIC) or any other device that can be operated in accordance with preprogrammed instructions and/or algorithms disclosed herein.

Further, as shown, the control system 44 may include a speed sensor 58 configured to generate a speed signal 60. The speed sensor 58 may be operatively associated with the underground mining machine 10. More specifically, however, the speed sensor 58 may be operatively associated with the wheels 20, endless track or other ground engaging members, of the underground mining machine 10 and be configured to measure an angular velocity of the wheels 20, endless track or other motive device, in order to generate the speed signal 60. The foregoing is only an example, as the speed sensor 58 may also be located anywhere on the underground mining machine 10 where the speed sensor 58 may generate the speed signal 60. For example, the speed sensor 58 may be located in the operator station 14 described above and utilize signals from multiple local-area network ("LAN") nodes located in an underground mine to generate the speed signal 60. In addition, besides the plurality of reel-in signals 48 and reel-out signal 52, the receiver module 56 may also be configured to receive the speed signal 60.

When the receiver module 56 of the electronic controller 54 receives the plurality of reel-in signals 48 from the reel-in switch 46, the receiver module 56 may pass the plurality of reel-in signals 48 to a comparator module 62. Once in the comparator module 62, the electronic controller 54 may determine whether the plurality of reel-in signals 48 generated by the reel-in switch 46 is a first reel-in signal 64 or a second reel-in signal 66. For example, the comparator module 62 may apply a timer to the plurality of reel-in signals 48 received from the reel-in switch 46 and determine that the plurality of reel-in signals 48 is a first reel-in signal 64 because the comparator module 62 received the plurality of reel-in signals 48 for more than a minimum amount of time. Alternatively, the comparator module 62 may apply a timer to the plurality of reel-in signals 48 received from the reel-in switch 46 and determine that the plurality of reel-in signals 48 is a second reel-in signal 66 because the comparator module 62 received the plurality of reel-in signals 48 for less than or equal to a minimum amount of time. However, these are only examples since the reel-in switch 46 may further be configured to generate different signals. For example, the reel-in switch 46 may generate a saw-tooth signal in order to generate the first reel-in signal 64 and a square-wave signal to generate the second reel-in signal 66, or vice versa for that matter.

In response to the plurality of reel-in signals 48, the comparator module 62 may determine whether or not to enter into a latching reeling-in mode 68. More specifically, if the comparator module 62 receives the first reel-in signal 64 the electronic controller 54 may enter into a latching module 70 thereby entering into latching reeling-in mode 68. Further, while in the latching module 70 the electronic controller 54 may be further configured to receive the speed signal 60 from the speed sensor 58 and limit the speed of the underground mining machine 10 to a reverse-direction maximum velocity 119. For example, while in this mode, the reverse-direction maximum velocity 119 of the underground mining machine 10 may be limited to one kilometer per hour ("KPH"), two KPH, three KPH, four KPH, five KPH, six, KPH, seven KPH, eight KPH, nine KPH, ten KPH or even greater. Further, while in the latching reeling-in mode 68, the electronic controller 54 may be further configured to receive the speed signal 60 from the speed sensor 58, calculate the velocity of the underground mining machine 10 and generate a cable-reel-in signal 74 while the velocity of the underground mining machine 10 is greater than zero KPH and less than or equal to the reverse-direction maximum velocity 119. In response, the cable reel-motor 36 may receive the cable-reel-in signal 74 and rotate the cable reel 18 in the first direction 40.

Additionally, the control system 44 may include a cable-reel-full-sensor 76 operatively associated with the cable reel 18. The cable-reel-full-sensor 76 may be configured to generate a reel-full signal 78 when activated, such as when the portion of the power cable 30 between the underground mining machine 10 and the power source 32 is fully coiled around the cable reel 18. The electronic controller 54 may be in electrical communication with the cable-reel-full-sensor 76 and be configured to receive the reel-full signal 78, such as by the receiver module 56. Furthermore, while in the latching reeling-in mode 68, the electronic controller 54 may be further configured to stop generating the cable-reel-in signal 74 in response to the reel-full signal 78.

The control system 44 may also include a parking brake sensor 80 operatively associated with the underground mining machine 10. More specifically, the parking brake sensor 80 may be operatively associated with a parking brake and be configured to generate a brake-on signal 82 when activated, such as when an operator applies the parking brake. The electronic controller 54 may be in electrical communication with the parking brake sensor 80 and be configured to receive the brake-on signal 82. Moreover, while in the latching reeling-in mode 68, the electronic controller 54 may be further configured to stop generating the cable-reel-in signal 74 in response to the brake-on signal 82.

In addition, the control system 44 may include a direction sensor 84 operatively associated with the underground mining machine 10. The direction sensor 84 may be configured to generate a reverse signal 86 when the underground mining machine 10 is moving in a reverse direction, such as when coiling the power cable 30. Alternatively, the direction sensor 84 may be configured to generate a forward signal 88 when the underground mining machine 10 is moving in a forward direction, such as when uncoiling the power cable 30. In one instance, the direction sensor 84 may be operatively associated with a gear selector configured to choose between a forward gear and a reverse gear for the underground mining machine 10. In another instance, the direction sensor 84 may be associated with a transmission of the underground mining machine 10. Nevertheless, the electronic controller 54 may be in electrical communication with the direction sensor 84 and may be configured to receive the reverse signal 86 and the forward signal 88. Moreover, while in the latching reeling-in mode 68, the electronic controller 54 may be further configured to stop generating the cable-reel-in signal 74 when the electronic controller 54 stops receiving the reverse signal 86.

Furthermore, in additional aspects of the current invention, while in the latching reeling-in mode 68, the electronic controller 54 may stop generating the cable-reel-in signal 74 when it again receives the plurality of reel-in signals 48 from the reel-in switch 46. Alternatively, and while in the latching reeling-in mode 68, the electronic controller 54 may stop generating the cable-reel-in signal 74 in response to receiving the reel-out signal 52.

Moving on, in response to the plurality of reel-in signals 48, the comparator module 62 may determine whether or not to enter into a non-latching reeling-in mode 90. More specifically, if the comparator module 62 receives the second reel-in signal 66 the electronic controller 54 may enter into a non-latching module 92 thereby entering into the non-latching reeling-in mode 90. Further, while in the non-latching reeling-in mode 90 the electronic controller 54 may be configured to generate the cable-reel-in signal 74 only while it receives the second reel-in signal 66 from the reel-in switch 46.

Still referring to FIG. 3, when the electronic controller 54 receives the reel-out signal 52 from the reel-out switch 50, it may generate a ccable-reel-out-signal 94 while receiving the reel-out signal 52. In response, the cable reel-motor 36 may receive the ccable-reel-out-signal 94 and rotate the cable reel 18 in the second direction 42. Furthermore, the control system 44 may additionally include a cable-reel-near-empty-sensor 96 operatively associated with the cable reel 18. The cable-reel-near-empty-sensor 96 may be configured to generate a reel-near-empty signal 98 when activated, such as when the length of the power cable 30 coiled around the cable reel 18 is nearing its end.

The electronic controller 54 may be in electrical communication with the cable-reel-near-empty-sensor 96 and be configured to receive a reel-near-empty signal 98. In response, the electronic controller 54 may enter into a speed-limiting reeling-out mode 100. More specifically, the electronic controller 54 may enter into a speed limiting module 102 thereby entering into the speed-limiting reeling-out mode 100. While in the speed-limiting reeling-out mode 100, the electronic controller 54 may be further configured to receive the speed signal 60 from the speed sensor 58 and limit the speed of the underground mining machine 10 to a forward-direction maximum velocity 127. While in this mode, the forward-direction maximum velocity 127 of the underground mining machine 10 may be limited to one KPH, two KPH, three KPH, four KPH, five KPH, six, KPH, seven KPH, eight KPH, nine KPH, ten KPH or even greater. The forward-direction maximum velocity 127 in the speed-limiting reeling-out mode 100 may be the same as, or different, than the reverse-direction maximum velocity 119 when the underground mining machine 10 is in the latching reeling-in mode 68. Furthermore, while in the speed-limiting reeling-out mode 100, the electronic controller 54 may be configured to calculate the velocity of the underground mining machine 10 and generate the ccable-reel-out-signal 94 while the velocity of the underground mining machine 10 is greater than zero KPH and less than or equal to the forward-direction maximum velocity 127.

The control system 44 may also include a cable-reel-empty sensor 104 operatively associated with the cable reel 18. The cable-reel-empty sensor 104 may be configured to generate a reel-empty signal 106 when activated, such as when the length of the power cable 30 coiled around the cable reel 18 is at its end. Furthermore, the electronic controller 54 may be in electrical communication with the cable-reel-empty sensor 104 and be configured to receive the reel-empty signal 106. While in the speed-limiting reeling-out mode 100, the electronic controller 54 may be further configured to stop generating the ccable-reel-out-signal 94 in response to the reel-empty signal 106. Moreover, while in the speed-limiting reeling-out mode 100, the electronic controller 54 may be further configured to generate a machine stop signal 108 in response to the reel-empty signal 106. As seen in FIG. 3, the underground mining machine 10 may receive the machine stop signal 108, thereby stopping movement of the underground mining machine 10.

Furthermore, as described above, the electronic controller 54 may be in electrical communication with the direction sensor 84. While in the speed-limiting reeling-out mode 100, the electronic controller 54 may be configured to receive the forward signal 88 and stop generating the ccable-reel-out-signal 94 when it stops receiving the forward signal 88.

INDUSTRIAL APPLICABILITY

In general terms, the present disclosure may find applicability in many industries including, but not limited to, underground mining, and more particularly, to systems and methods for managing power cabling of underground mining machines. Although applicable to any underground mining machine 10, the present disclosure may be particularly applicable to an underground mining machine 10 including the reeling system 34 having the cable reel 18 rotatably associated with the underground mining machine 10 configured to coil and uncoil the power cable 30.

In general, the present disclosure employs the reel-in switch 46, the reel-out switch 50, the electronic controller 54 and numerous sensors (such as the speed sensor 58, cable-reel-full-sensor 76, cable-reel-near-empty-sensor 96 and cable-reel-empty sensor 104) to limit the velocity of the underground mining machine 10 to the reverse-direction maximum velocity 119 when coiling the power cable 30 around the cable reel 18 and to the forward-direction maximum velocity 127 when uncoiling the power cable 30 from the cable reel 18, thereby mitigating damage to the power cable 30. More specifically, when coiling the power cable 30, the underground mining machine 10 may enter into the latching reeling-in mode 68 that only coils the power cable 30 when the velocity of the underground mining machine 10 is greater than zero KPH and less than or equal to the reverse-direction maximum velocity 119. Further, when uncoiling the power cable 30, the underground mining machine 10 may enter into the speed-limiting reeling-out mode 100 that only uncoils the power cable 30 when the velocity of the underground mining machine 10 is greater than zero KPH and less than or equal to the forward-direction maximum velocity 127. Limiting the velocity of the underground mining machine 10, instead of matching the speed of the cable reel 18 to the underground mining machine 10, reduces the chance that the underground mining machine 10 will overrun the power cable 30 during coiling and additionally mitigates the likelihood that the power cable 30 breaks away from the underground mining machine 10 during uncoiling.

Figure 4:
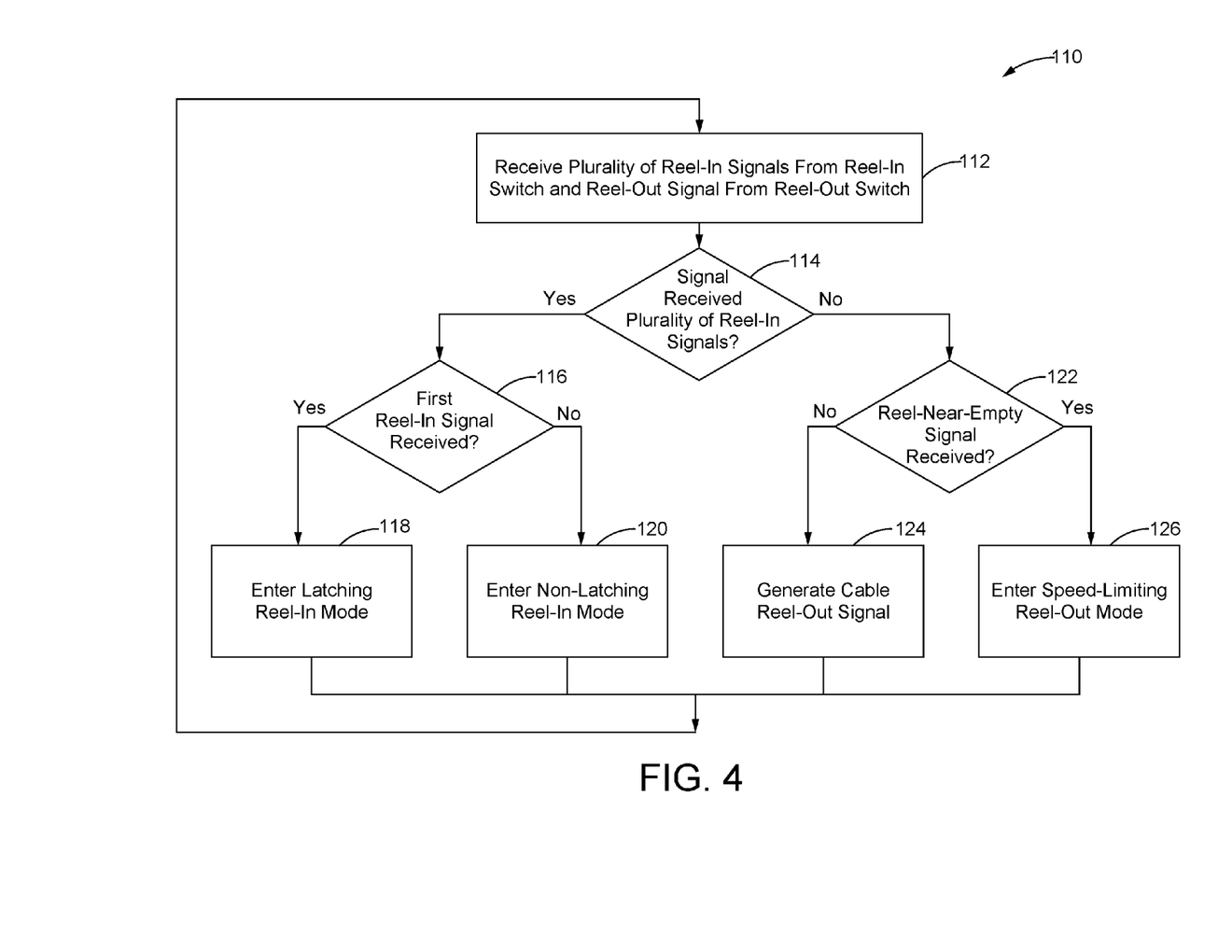
FIG. 4 is a flowchart illustrating exemplary steps of a method for managing an underground mining machine of the present disclosure.

One exemplary algorithm or electronic controller implemented method 110 for managing an underground mining machine 10 is diagrammatically provided in FIG. 4. As shown, the electronic controller 54 may be configured to continuously, periodically or intermittently receive the plurality of reel-in signals 48 from the reel-in switch 46 and the reel-out signal 52 from the reel-out switch 50 at block 112. In block 114, the electronic controller 54 may determine whether the signals received are the plurality of reel-in signals 48. If the signals received are the plurality of reel-in signals 48 then the electronic controller 54 may determine whether the first reel-in signal 64 has been received at block 116 and enter into the latching reeling-in mode 68 at block 118. The latching reeling-in mode 68 may be configured to limit a reverse direction speed of the underground mining machine 10 to a reverse-direction maximum velocity 119, receive the speed signal 60 from the speed sensor 58 operatively associated with the underground mining machine 10, calculate a reverse direction velocity for the underground mining machine 10 and generate the cable-reel-in signal 74 only while the reverse direction velocity of the underground mining machine 10 is greater than zero KPH and less than or equal to the reverse-direction maximum velocity 119. If however the second reel-in signal 66 is received instead, then the electronic controller 54 may enter into the non-latching reeling-in mode 90 at block 120. In the non-latching reeling-in mode 90, the electronic controller 54 may be configured to generate the cable-reel-in signal 74 only while receiving the second reel-in signal 66.

Returning to block 114, if the electronic controller 54 did not receive the plurality of reel-in signals 48, then the electronic controller 54 may determine if it has received the reel-near-empty signal 98 at block 122. If the electronic controller 54 has not yet received the reel-near-empty signal 98 then it may generate a ccable-reel-out-signal 94 at block 124. However, if the electronic controller 54 has received the reel-near-empty signal 98, then it may enter the speed-limiting reeling-out mode 100 at block 126. The speed-limiting reeling-out mode 100 may be configured to limit a forward direction speed of the underground mining machine 10 to a forward-direction maximum velocity 127, receive a speed signal 60 from the speed sensor 58 operatively associated with the underground mining machine 10, calculate a forward direction velocity for the underground mining machine 10 and generate the ccable-reel-out-signal 94 only while the forward direction speed of the underground mining machine 10 is greater than zero KPH and less than or equal to the forward-direction maximum velocity 127.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A system for managing an underground mining machine, comprising:
    a cable reel rotatably associated with the underground mining machine;
    a reel-in switch located in an operator station configured to generate a plurality of reel-in signals;
    a reel-out switch located in the operator station configured to generate a reel-out signal; and
    an electronic controller in electrical communication with the reel-in switch and the reel-out switch, the electronic controller configured to receive the plurality of reel-in signals from the reel-in switch and enter into two or more reeling-in modes in response to the plurality of reel-in signals and limit a reverse-direction maximum velocity of the underground mining machine in at least one of the two or more reeling-in modes;
    wherein the electronic controller enters a non-latching reeling-in mode in response to the plurality of reel-in signals, wherein while in the non-latching reeling-in mode the electronic controller is further configured to generate a cable-reel-in signal in response to the plurality of reel-in signals while the electronic controller the plurality of reel-in signals.

2. The system according to claim 1, further including a speed sensor operatively associated with the underground mining machine configured to generate a speed signal, wherein the electronic controller is also in electrical communication with the speed sensor, wherein the electronic controller is further configured to receive the speed signal, wherein the electronic controller enters a latching reeling-in mode in response to the plurality of reel-in signals, wherein while in the latching reeling-in mode the electronic controller is further configured to limit speed of the underground mining machine to the reverse-direction maximum velocity and wherein while in the latching reeling-in mode the electronic controller is further configured to receive the speed signal from the speed sensor, calculate a velocity for the underground mining machine and generate a cable-reel-in signal while the velocity of the underground mining machine is greater than zero and less than or equal to the reverse-direction maximum velocity.

3. The system according to claim 2, further including a cable-reel-full-sensor operatively associated with the cable reel configured to generate a reel-full signal when activated, wherein the electronic controller is also in electrical communication with the cable-reel-full-sensor and wherein while in the latching reeling-in mode the electronic controller is further configured to receive the reel-full signal from the cable-reel-full-sensor and stop generating the cable-reel-in signal in response to the reel-full signal.

4. The system according to claim 2, further including a parking brake sensor operatively associated with a parking brake configured to generate a brake-on signal when activated, wherein the electronic controller is also in electrical communication with the parking brake sensor and wherein while in the latching reeling-in mode the electronic controller is further configured to receive the brake-on signal from the parking brake sensor and stop generating the cable-reel-in signal in response to the brake-on signal.

5. The system according to claim 2, further including a direction sensor operatively associated with the underground mining machine configured to generate a reverse signal when activated, wherein the electronic controller is also in electrical communication with the direction sensor and wherein while in the latching reeling-in mode the electronic controller is further configured to receive the reverse signal from the direction sensor and stop generating the cable-reel-in signal when the electronic controller stops receiving the reverse signal.

6. The system according to claim 2, wherein while in the latching reeling-in mode the electronic controller is further configured to stop generating the cable-reel-in signal when it again receives the plurality of reel-in signals from the reel-in switch.

7. The system according to claim 2, wherein while in the latching reeling-in mode the electronic controller is further configured to stop generating the cable-reel-in signal in response to the reel-out signal.

8. The system according to claim 1, wherein the reel-out switch is further configured to only generate the reel-out signal while being actuated, wherein the electronic controller is further configured to receive the reel-out signal and generate a cable-reel-out-signal while receiving the reel-out signal.

9. The system according to claim 8, further including a cable-reel-empty sensor operatively associated with the cable reel configured to generate a reel-empty signal when activated, wherein the electronic controller is also in electrical communication with the cable-reel-empty sensor and wherein the electronic controller is further configured to stop generating the cable-reel-out-signal in response to the reel-empty signal.

10. The system according to claim 8, further including a cable-reel-near-empty-sensor operatively associated with the cable reel configured to generate a reel-near-empty signal when activated, further including a speed sensor operatively associated with the underground mining machine configured to generate a speed signal, wherein the electronic controller is also in electrical communication with the cable-reel-near-empty-sensor and the speed sensor, wherein the electronic controller enters a speed-limiting reeling-out mode in response to the reel-near-empty signal, wherein while in the speed-limiting reeling-out mode the electronic controller is further configured to limit speed of the underground mining machine to a forward-direction maximum velocity and wherein while in the speed-limiting reeling-out mode the electronic controller is further configured to receive the speed signal from the speed sensor, calculate a velocity for the underground mining machine and generate the cable-reel-out-signal while the velocity of the underground mining machine is greater than zero and less than or equal to the forward-direction maximum velocity.

11. The system according to claim 10, further including a cable-reel-empty sensor operatively associated with the cable reel configured to generate a reel-empty signal when activated, further including a direction sensor operatively associated with the underground mining machine configured to generate a forward signal when activated, wherein the electronic controller is also in electrical communication with the cable-reel-empty sensor and the direction sensor, wherein while in the speed-limiting reeling-out mode the electronic controller is further configured to stop generating the cable-reel-out-signal in response to the reel-empty signal and generate a machine stop signal and wherein while in the speed-limiting reeling-out mode the electronic controller is further configured to receive the forward signal from the direction sensor and stop generating the reel-out signal when the electronic controller stops receiving the forward signal.

12. An underground mining machine, comprising:
a chassis;
a motor supported by the chassis;
a cable reel rotatably associated with the underground mining machine, the cable reel configured to coil and uncoil a power cable;
a cable reel-motor rotationally engaged with the cable reel, the cable reel-motor configured to rotate the cable reel in a first direction when coiling the power cable, the cable reel-motor configured to rotate the cable reel in a second direction when uncoiling the power cable;
a cable-reel-near-empty-sensor operatively associated with the cable reel, the cable-reel-near-empty-sensor configured to generate a reel-near-empty signal when activated;
a speed sensor operatively associated with the underground mining machine, the speed sensor configured to generate a speed signal;
a reel-in switch located in an operator station, the reel-in switch configured to generate a plurality of reel-in signals;
a reel-out switch located in the operator station, the reel-out switch configured to generate a reel-out signal;
one or more arms operatively connected to the underground mining machine, further including a rail operatively engaged with each of the one or more arms, further including a work implement slidably engaged with the rail, wherein the work implement is movable between a working position when engaging a wall of an underground mine and a retracted position when not engaging the wall of the underground mine; and
an electronic controller in electrical communication with the cable reel-motor, the cable-reel-near-empty-sensor, the speed sensor, the reel-in switch and the reel-out switch, the electronic controller configured to:
receive the reel-near-empty signal, the speed signal, the plurality of reel-in signals, and the reel-out signal, and
generate a cable-reel-out-signal and a cable-reel-in signal in response to at least one of the reel-near-empty signal, the speed signal, the plurality of reel-in signals or the reel-out signal.

13. The underground mining machine according to claim 12, wherein the electronic controller enters a latching reeling-in mode in response to the plurality of reel-in signals, wherein while in the latching reeling-in mode the electronic controller is further configured to limit speed of the underground mining machine to a reverse-direction maximum velocity and wherein while in the latching reeling-in mode the electronic controller is further configured to receive the speed signal from the speed sensor, calculate a velocity for the underground mining machine and generate the cable-reel-in signal while the velocity of the underground mining machine is greater than zero and less than or equal to the reverse-direction maximum velocity and wherein the cable reel-motor is further configured to receive the cable-reel-in signal and rotate the cable reel in the first direction in response to the cable-reel-in signal.

14. The underground mining machine according to claim 12, wherein the electronic controller enters a speed-limiting reeling-out mode in response to the reel-near-empty signal, wherein while in the speed-limiting reeling-out mode the electronic controller is further configured to limit speed of the underground mining machine to a forward-direction maximum velocity and wherein while in the speed-limiting reeling-out mode the electronic controller is further configured to receive the speed signal from the speed sensor, calculate a velocity for the underground mining machine and generate the cable-reel-out-signal while the velocity of the underground mining machine is greater than zero and less than or equal to the forward-direction maximum velocity and wherein the cable reel-motor is further configured to receive the reel-out signal and rotate the cable reel in the second direction in response to the cable-reel-in signal.

15. A method for managing an underground mining machine, comprising:
receiving, at an electronic controller located in the underground mining machine, a plurality of reel-in signals from a reel-in switch located in an operator station;
entering, using the electronic controller, a latching reeling-in mode in response to receiving a first reel-in signal from the reel-in switch, the latching reeling-in mode configured to limit a reverse direction speed of the underground mining machine to a reverse-direction maximum velocity;
receiving a speed signal from a speed sensor operatively associated with the underground mining machine;
determining a reverse direction velocity for the underground mining machine;
generating a cable-reel-in signal while the reverse direction velocity of the underground mining machine is greater than zero and less than or equal to the reverse-direction maximum velocity; and
entering a non-latching reeling-in mode in response to receiving a second reel-in signal from the reel-in switch, the non-latching reeling-in mode configured to generate the cable-reel-in signal while receiving the second reel-in signal.

16. The method according to claim 15, further including entering a speed-limiting reeling-out mode in response to receiving a reel-out signal from a reel-out switch located in the operator station and a reel-near-empty signal from a cable-reel-near-empty-sensor operatively associated with a cable reel, the speed-limiting reeling-out mode configured to limit a forward direction speed of the underground mining machine to a forward-direction maximum velocity, receive the speed signal from the speed sensor operatively associated with the underground mining machine, calculate a forward direction velocity for the underground mining machine and generate a cable-reel-out-signal while the forward direction velocity of the underground mining machine is greater than zero and less than or equal to the forward-direction maximum velocity.

* * * * *